(12) United States Patent
Usui

(10) Patent No.: US 6,754,150 B1
(45) Date of Patent: Jun. 22, 2004

(54) CONTENTS DATA REPRODUCING APPARATUS

(75) Inventor: Shunji Usui, Fukushima (JP)

(73) Assignee: Denon, Ltd., Tokyo (JP)

( * ) Notice: Subject to any disclaimer, the term of this patent is extended or adjusted under 35 U.S.C. 154(b) by 777 days.

(21) Appl. No.: 09/649,965

(22) Filed: Aug. 29, 2000

(30) Foreign Application Priority Data

Aug. 30, 1999 (JP) ........................................... 11-243548
Aug. 31, 1999 (JP) ........................................... 11-246276

(51) Int. Cl.[7] ................................................ G11B 5/09
(52) U.S. Cl. ................................ 369/47.33; 369/53.31
(58) Field of Search ........................... 369/30.01, 32.01, 369/47.28, 47.3, 47.31, 47.32, 47.33, 47.34, 53.31, 53.34, 124.08

(56) References Cited

U.S. PATENT DOCUMENTS 4,972,396 A * 11/1990 Rafner ..................... 369/30.03
5,448,539 A    9/1995 Kamioka

FOREIGN PATENT DOCUMENTS

JP    6-162557    6/1994
JP    7-272451    10/1995

* cited by examiner

*Primary Examiner*—Paul W. Huber
(74) *Attorney, Agent, or Firm*—Dickstein Shapiro Morin & Oshinsky LLP

(57) ABSTRACT

A contents data reproducing apparatus that continuously reproduces pieces of music without producing a soundless state between music pieces is provided. When a pickup 2 finishes reading of reproducing object piece of audio data, a microcomputer 10 stops writing of the audio data into a storage unit 4 and makes the pickup move to a front of the next reproducing object piece of audio data to start reading of the next reproducing piece of audio data. Then, when a result in a level detection unit 7 shows that the level of the next reproducing object piece of audio data is higher than the reference level, then, writing of the next reproducing object piece of audio data, which is read by the pickup 2, into the storage unit 4 is started. An audio data conversion unit 8 reads the audio data stored in the storage unit 4 and reproduces it.

5 Claims, 7 Drawing Sheets

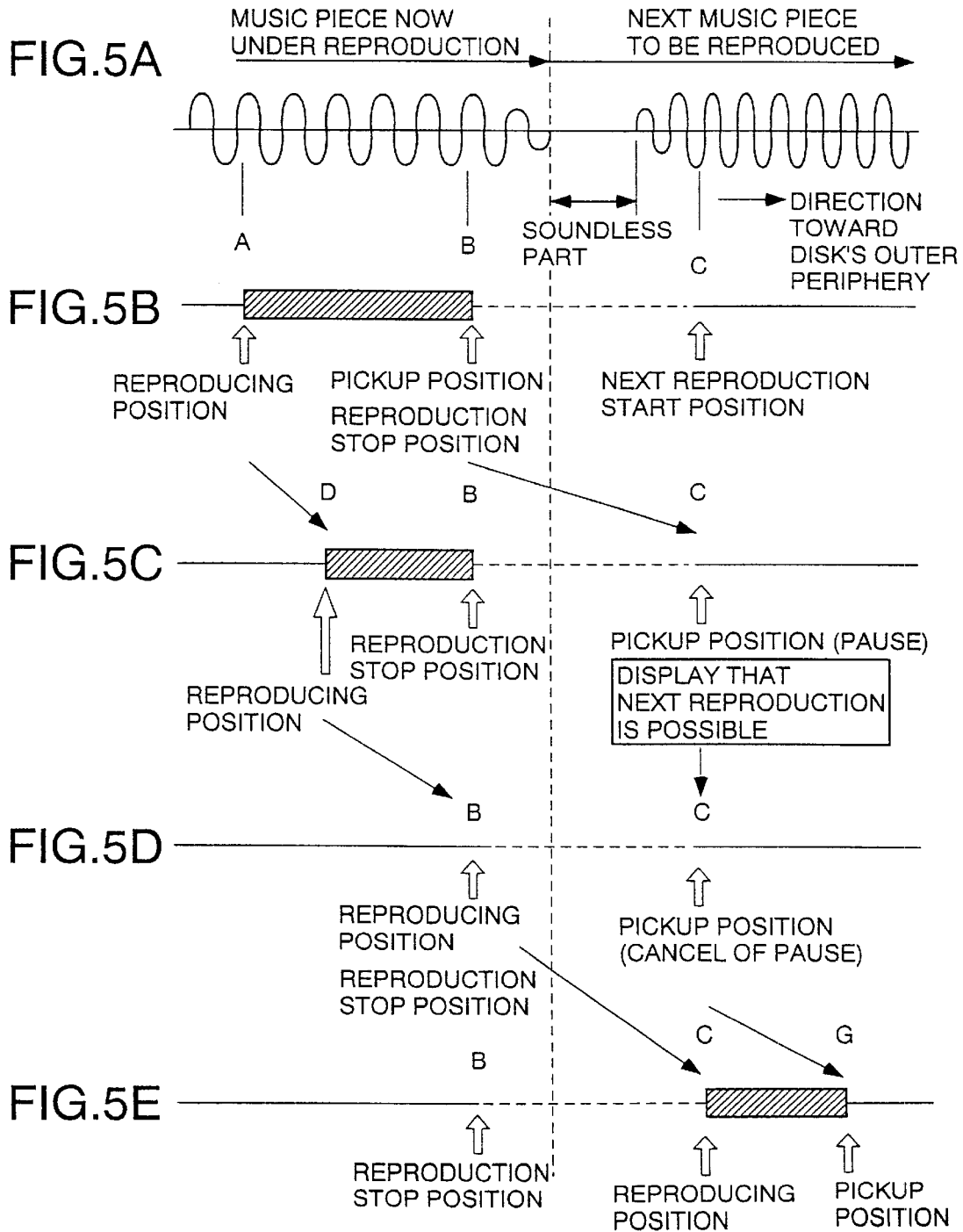

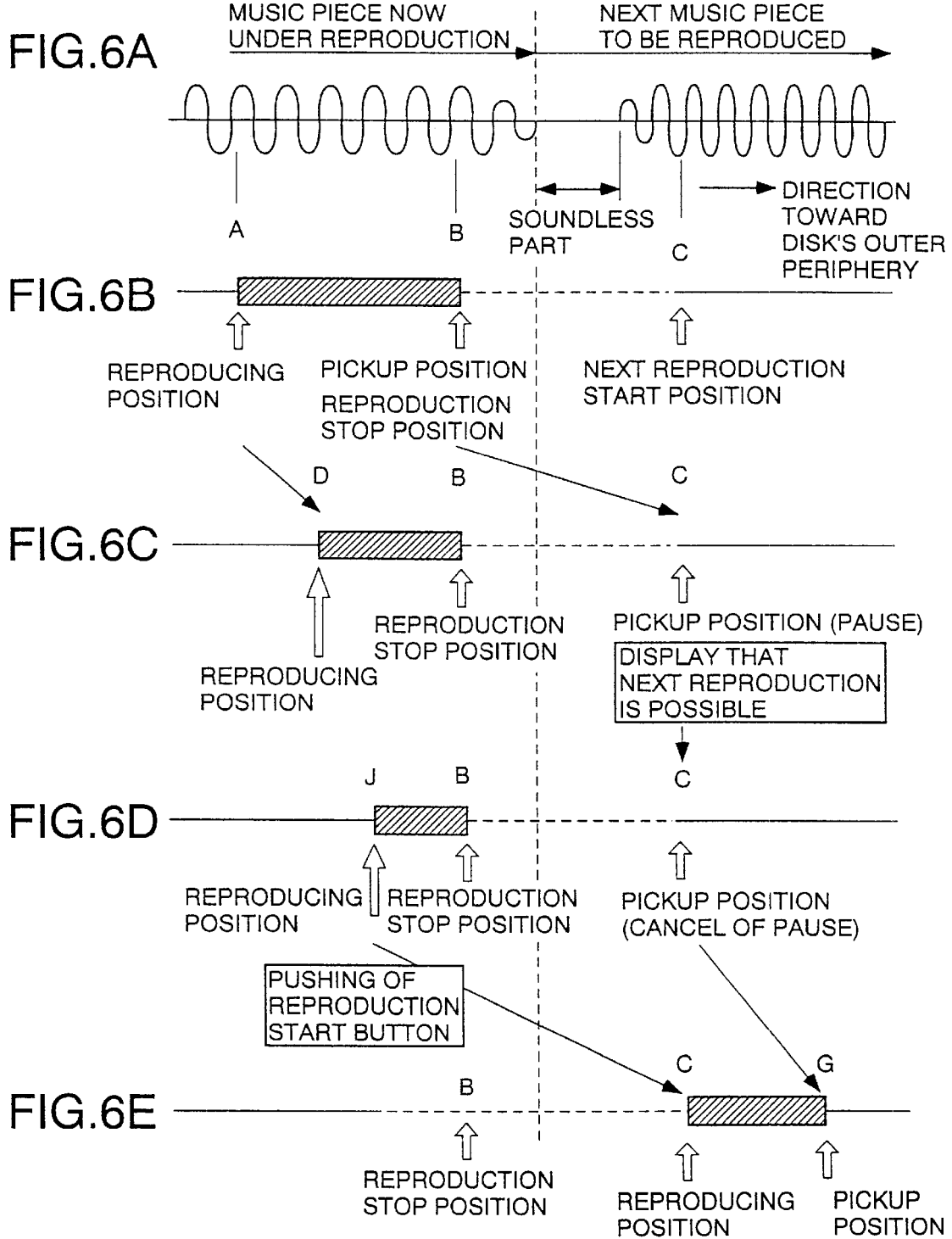

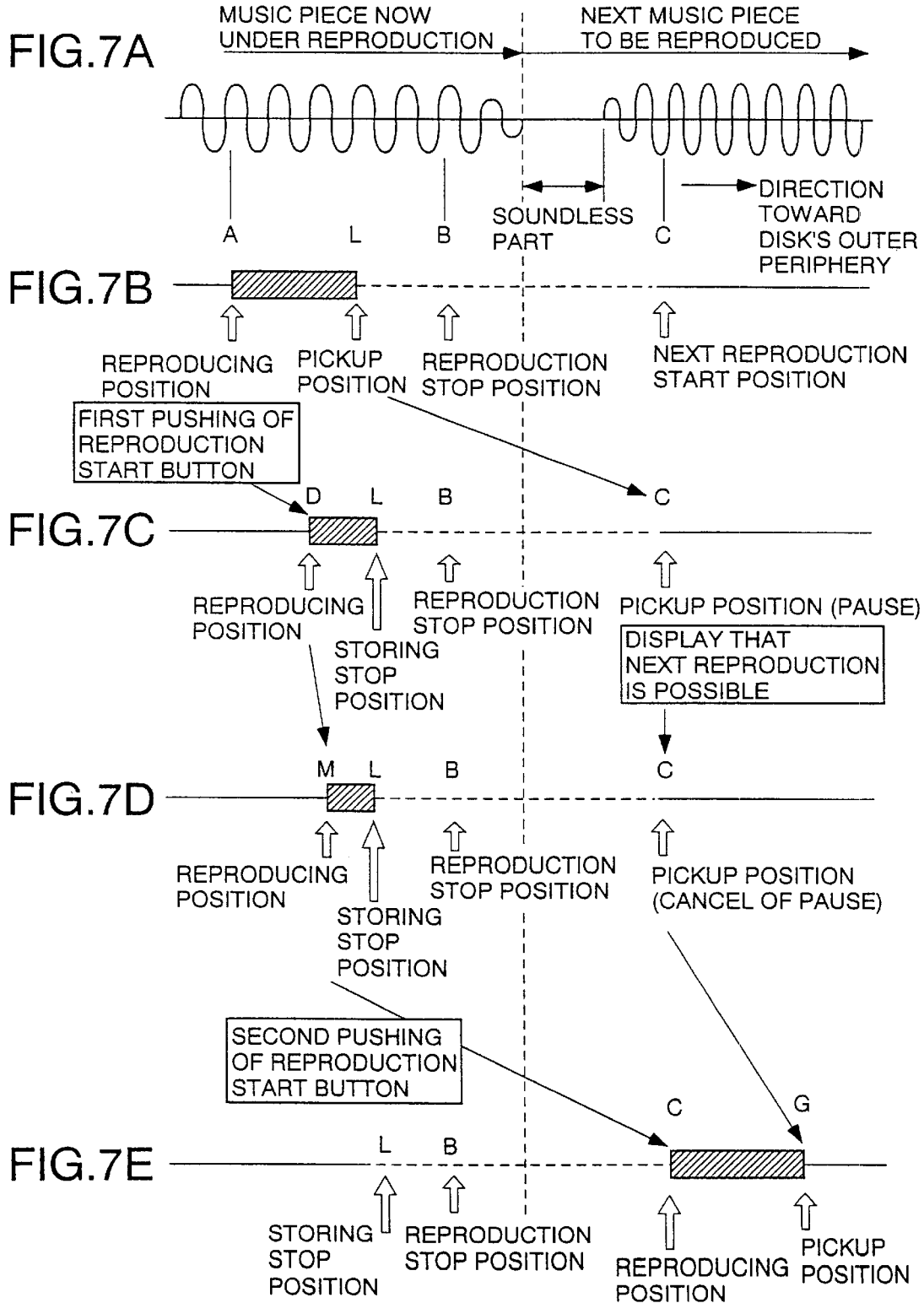

CONTENTS DATA REPRODUCING APPARATUS

This application claims a priority based on Japanese Patent Application No. 11-243548 filed on Aug. 30, 1999 and Japanese Patent Application No. 11-246276 filed on Aug. 31, 1999, the entire contents of which are incorporated herein by reference for all purposes.

BACKGROUND OF THE INVENTION

The present invention relates to a contents data reproducing apparatus that reproduces contents data such as audio data, video data, or the like recorded in a record medium such as an optical disk.

Conventionally, in an event such as various ceremonies and parties, it is prepared to liven up the event by changing a piece of BGM (Background Music) as the event proceeds. For example, in a wedding reception, different pieces of BGM are reproduced between a scene of entrance of a bride and bridegroom and a scene of the bride and bridegroom moving on among invited guests. In that case, it is necessary to smoothly change the pieces of BGM reproduced in order not to destroy the atmosphere of the wedding reception.

Thus, conventionally, for example, a plurality of pieces of BGM used in an event are selected and edited in advance, and recorded in a disk such as CD-R (Compact Disc Recordable). This disk is set to a disk player and the pieces of BGM are continuously reproduced, thus changing pieces of BGM in accordance with progress of the event.

SUMMARY OF THE INVENTION

In the case that a plurality of pieces of BGM to be used in an event are recorded in a disk with CD-DA (Compact Disc Digital Audio) format, there are soundless parts between music pieces in CD-DA. Accordingly, when this disk is continuously played in a conventional disk player, the soundless parts between music pieces are also reproduced. This may destroy the atmosphere of the event.

Further, an event does not always proceed according to a timetable. Thus, sometimes, it is necessary that reproduction of a music piece is stopped in mid course and reproduction of the next music piece is started. In such a case, in a conventional disk player, a soundless state continues while a pickup selects and searches the next music piece. This makes the attendance become aware that an operator is carrying out selecting operation, and may destroy the atmosphere of the event.

In connection with this, such a disk player is proposed that, according to an operator's direction, starting parts of a plurality of music pieces recorded on a disk are stored in a memory in advance, and a starting part of a music piece to be reproduced is read from the memory and reproduced while a pickup is searching the disk for the music piece in question. This disk player can prevent a soundless state in a period of searching. However, an operator must carry out complicated operations such as finding positions in which music pieces of BGM used in an event are recorded in a CD and storing the starting parts of those music pieces into a memory. Further, a large memory capacity is required for storing starting parts of a plurality of music pieces, and it increases the cost.

The present invention has been made taking the above situation into consideration. An object of the present invention is to provide a contents data reproducing apparatus that can continuously reproduce various music pieces recorded in one record medium (for example, an optical disk) without bringing a soundless state.

In order to solve the above-mentioned problems, a first mode of the present invention provides a contents data reproducing apparatus for reproducing plural pieces of contents data stored in a storage medium, comprising:

a pickup for reading the contents data from the storage medium;

a level comparison means for comparing between a level of the contents data read by said pickup and a predetermined reference level;

a buffer for storing the contents data read by said pickup;

a reproducing means for reproducing the contents data stored in said buffer; and a control means for writing the contents data read by said pickup into said buffer and for reading the contents data stored in said buffer to send said contents data to said reproducing means;

wherein:

when said pickup finishes reading of a reproducing object piece of contents data, said control means stops writing of the contents data into said buffer and makes said pickup move to a front of a next reproducing object piece of contents data to start reading of said next reproducing object piece of contents data; and when, a result of comparison by said level comparison means shows that a level of said next reproducing object piece of contents data becomes higher than said predetermined reference level, then, said control means starts writing of the next reproducing object piece of contents data, which is read by said pickup, into said buffer means.

A second mode of the present invention provides a contents data reproducing apparatus for reproducing plural pieces of contents data stored in a storage medium, comprising:

a pickup for reading the contents data from the storage medium;

a level comparison means for comparing between a level of the contents data read by said pickup and a predetermined reference level;

a buffer for storing the contents data read by said pickup;

a reproducing means for reproducing the contents data stored in said buffer;

a reproducing object designation receiving means for receiving designation of a next piece of contents data to be reproduced out of the plural pieces of contents data stored in said storage medium;

a display means for displaying that a piece of contents data whose designation is received by said reproducing object designation receiving means can be immediately reproduced;

a reproduction start instruction receiving means for receiving an instruction of starting reproduction of the piece of contents data whose designation is received by said reproducing object designation receiving means; and a control means for wiring the contents data read by said pickup into said buffer and for reading the contents data stored in said buffer to send said contents data to said reproducing means;

wherein:

when, in the course of reading a reproducing object piece of contents data by said pickup, said reproducing object designation receiving means receives designation of a next piece of contents data to be reproduced, said control means stops writing of contents data into said buffer, and makes said pickup move to a front of the designated piece of contents data to start reading of said designated piece of contents data;

when the pickup that has started reading said designated piece of contents data moves to a position at which a result of comparison by said level comparison means shows that a level of said designated contents data becomes higher than the predetermined reference level, then, said control means makes said pickup wait at said position and makes display means display that said designated piece of contents data can be immediately reproduced; and when said reproduction start instruction receiving means receives an instruction of starting reproduction in a state that said display means displays that immediate reproduction is possible, then, said control means cancels waiting of said pickup to make the pickup start reading said designated piece of contents data, and starts writing of said designated piece of contents data, which is read by said pickup, into said buffer.

Here, in the above-described first and second modes, the level of the contents data means audio level (sound volume level) in the case that the contents data is audio data, and brightness level in the case of video data.

Further, the predetermined reference level means the soundless level in the case that the contents data is audio data, and the black level in the case of video data.

Further, a third mode of the present invention provides a contents data reproducing apparatus for reproducing plural pieces of contents data stored in a storage medium, comprising:

a pickup for reading the contents data from the storage medium;

a buffer for storing the contents data read by said pickup;

a reproducing means for reproducing the contents data stored in said buffer;

an addressing receiving means for receiving designation of a reproduction stop address at which reproduction of a piece of contents data under reproduction out of said plural pieces of contents data stored in said storage medium is stopped, and designation of a reproduction start address at which reproduction of a next piece of contents data to be reproduced is started; and a control means for writing the contents data read by said pickup into said buffer and for reading the contents data stored in said buffer to send said contents data to said reproducing means;

wherein:

when a position at which said pickup reads said piece of contents data under reproduction arrives at a position corresponding to the reproduction stop address received by said addressing receiving means, then, said control means stops writing of the contents data into said buffer and makes said pickup move to a position corresponding to the reproduction start address received by said addressing receiving means; and when said pickup arrives at the position corresponding to said reproduction start address, said control means makes said pickup wait at said position corresponding to the reproduction start address;

when data corresponding to said reproduction stop address is read from said buffer to said reproducing means in a state that said pickup waits, then said control means cancels waiting of said pickup to make the pickup start reading of said next piece of contents data to be reproduced, and starts writing of said next piece of contents data to be reproduced, which is read by said pickup, into said buffer.

Further, a fourth mode of the present invention provides a contents data reproducing apparatus for reproducing plural pieces of contents data stored in a storage medium, comprising:

a pickup for reading the contents data from the storage medium;

a buffer for storing the contents data read by said pickup;

a reproducing means for reproducing the contents data stored in said buffer;

an addressing receiving means for receiving designation of a reproduction stop address at which reproduction of a piece of contents data under reproduction out of said plural pieces of contents data stored in said storage medium is stopped, and designation of a reproduction start address at which reproduction of a next piece of contents data to be reproduced is started;

a reproduction start instruction receiving means for receiving an instruction of starting reproduction of said next piece of contents data to be reproduced whose reproduction start address is received by said addressing receiving means;

a display means for displaying that said next piece of contents data to be reproduced for which the instruction of starting reproduction is received by said reproduction start instruction receiving means can be immediately reproduced; and a control means for writing the contents data read by said pickup into said buffer and for reading the contents data stored in said buffer to send said contents data to said reproducing means;

wherein:

when a position at which said pickup reads said piece of contents data under reproduction arrives at a position corresponding to the reproduction stop address received by said addressing receiving means, then, said control means stops writing of the contents data into said buffer and makes said pickup move to a position corresponding to the reproduction start address received by said addressing receiving means;

when said pickup arrives at the position corresponding to said reproduction start address, said control means makes said pickup wait at said position corresponding to said reproduction start address and makes said display means display that the next piece of contents data to be reproduced can be immediately reproduced; and when said reproduction start instruction receiving means receives an instruction of starting reproduction in a state that said display means displays that immediate reproduction is possible, then said control means cancels waiting of said pickup to make the pickup start reading of said next piece of contents data to be reproduced, and, after clearing said buffer, starts writing of said next piece of contents data to be reproduced, which is read by said pickup, into said buffer.

Here, the present mode may be varied as follows.

Namely, when said reproduction start instruction receiving means receives an instruction of starting reproduction, then, said control means stops writing of the contents data into said buffer and makes said pickup move to a position corresponding to the reproduction start address received by said addressing receiving means;

when said pickup arrives at the position corresponding to said reproduction start address, said control means makes said pickup wait at said position corresponding to said reproduction start address and makes said display means display that the next piece of contents data to be reproduced can be immediately reproduced; and when said reproduction start instruction receiving means receives an instruction of starting reproduction in a state that said display means displays that immediate reproduction is possible, then said control means cancels waiting of said pickup to make the pickup start reading of said next piece of contents data to be reproduced, and, after clearing said buffer, starts writing of said next piece of contents data to be reproduced, which is read by said pickup, into said buffer.

BRIEF DESCRIPTION OF THE DRAWINGS

FIGS. 5A to 5E are a view schematically showing waveforms of audio signals demodulated from audio data recorded on the CD 11 and relations among the audio data stored in the storage unit 4, reproducing positions and pickup positions, in the case that, in the course of reproducing audio data, the CD player shown in FIG. 4 receives designation of a reproduction stop address of the audio data under reproduction and a reproduction start address of the next audio data to be reproduced, through the addressing receiving button provided in the display and operation unit 9;

FIGS. 6A to 6E are a view schematically showing, in the second embodiment of the present invention, waveforms of audio signals demodulated from the audio data recorded on a CD 11, and relations among the audio data stored in the storage unit 4, reproducing positions and pickup positions, in the case that the reproduction start button provided in the display and operation unit 9 is pushed in the state that, in the course of reproduction of audio data, the CD player shown in FIG. 4 has received designation of the reproduction stop address of the audio data under reproduction and the reproduction start address of the next audio data to be reproduced, through the addressing receiving button provided in the display and operation unit 9; and FIGS. 7A to 7E are a view schematically showing, in the modified second embodiment of the present invention, waveforms of audio signals demodulated from the audio data recorded on a CD 11, and relations among the audio data stored in the storage unit 4, reproducing positions and pickup positions, in the case that the reproduction start button provided in the display and operation unit 9 is pushed in the state that, in the course of reproduction of audio data, the CD player shown in FIG. 4 has received designation of the reproduction stop address of the audio data under reproduction and the reproduction start address of the next audio data to be reproduced, through the addressing receiving button provided in the display and operation unit 9.

DETAILED DESCRIPTION OF THE PREFERRED EMBODIMENTS

In the following, embodiments of the present invention will be described.

To begin with, a first embodiment of the present invention will be described.

Figure 1:
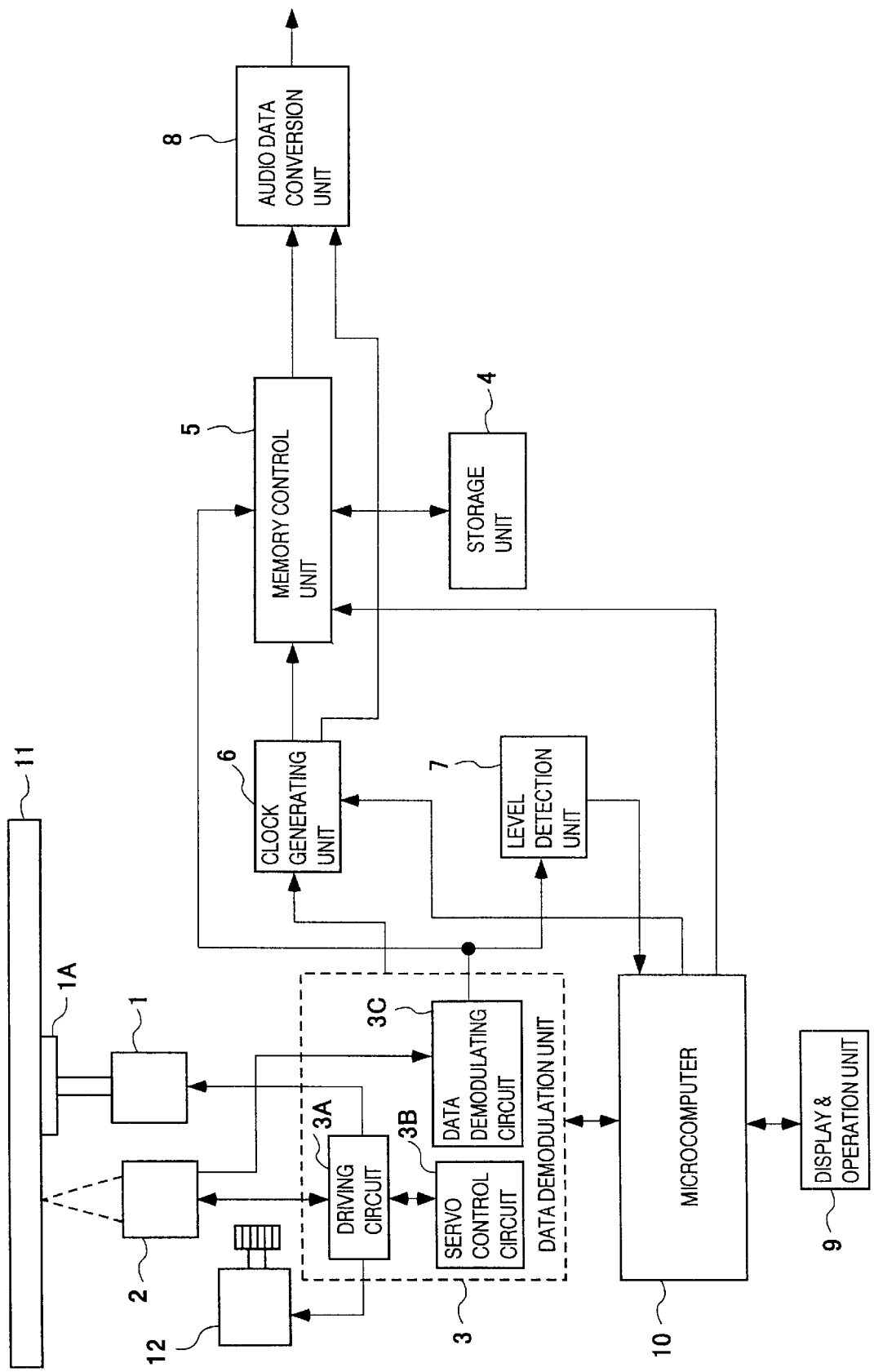
FIG. 1 is a schematic block diagram of a CD player to which a first embodiment of the present invention is applied.

FIG. 1 is a schematic block diagram of a CD player to which the first embodiment of the present invention is applied.

In the CD player of the present embodiment, a compact disc (hereinafter, referred to as CD) is rotated and an optical pickup detects audio data recorded on the CD, so as to reproduce pieces of music.

In FIG. 1, a CD 11 is placed on a turntable 1A fixed on a rotating shaft of a spindle motor 1, and rotated. An optical pickup 2 irradiates a laser beam onto an information recording layer of the CD 11, and receives the reflected beam to detect an audio data signal, a focusing error signal and a tracking error signal. Further, the optical pickup 2 is provided with a focusing coil and tracking coil for driving an objective lens in order to maintain focusing and tracking of the laser beam irradiated onto the information recording layer of the CD 11.

A slide motor 12 is a feed motor for moving the optical pickup 2 in the radial direction of the CD 11. By this motor, the objective lens of the optical pickup 2 is driven being controlled such that the objective lens is positioned in the center of its movable range. Further, when a position is so distant in the radial direction of the CD 11 that only the tracking coil can not drive the objective lens to track the position, the slide motor 12 move the optical pickup 2 to that position.

A servo control and data demodulation unit 3 comprises: a driving circuit 3A for driving the spindle motor 1, the optical pickup 2 and the slide motor 12; a servo control circuit 3B for outputting a control signal to the driving circuit 3A; and a data demodulating circuit 3C for demodulating audio data and address data from record data detected by the optical pickup 2.

The servo control circuit 3B performs focus servo control, in which a focus error signal detected by the optical pickup 2 is used for focusing a laser beam on the information recording layer of an optical disk, and tracking servo control, in which a tracking error signal detected by the optical pickup 2 is used for making a laser beam continuously follow a recording track of the optical disk.

Further, the servo control circuit 3B compares a synchronizing signal contained in record data with a synchronous reference signal outputted from a clock generating unit 6, with regard to their phases, and carries out PLL (Phase Lock Loop) control so that a phase difference between the two signals becomes constant. The servo control circuit 3B inputs a control signal obtained by the PLL control into the driving circuit 3A so as to control the linear velocity of the spindle motor 1 to be constant.

Further, the servo control circuit 3B amplifies the focus error signal and the tracking error signal detected by the optical pickup 2, carries out phase correction on them, and outputs them as control signals to the driving circuit 3A. The driving circuit 3A drives the focus coil and the tracking coil of the optical pickup 2 in accordance with these control signals, to carry out the focus servo control and the tracking servo control.

The data demodulating circuit 3C demodulates the audio data and the address data from an EFM (Eighteen to Fourteen Modulation) signal obtained by waveform shaping of a HF (High Frequency) signal detected by the optical pickup 2. Further, the data demodulating circuit 3C use an error correcting code to correct the audio data containing errors. Further, the audio data outputted from the data demodulating circuit 3C is stored in a storage unit 4 for the time being, and thereafter, read from there to be inputted into an audio data conversion unit 8.

The audio data conversion unit 8 comprises a DIF (Digital Filter), a DAC (Digital to Analog Converter), and an amplifier. The DIF carries out oversampling on the audio data to displace a folding frequency of quantization noise to a frequency higher than the audio band. The DAC converts digital audio data outputted from the DIF to analog audio signal. The analog audio signal outputted from the DAC is amplified in the amplifier and outputted to the outside. Here, the clock used in the DIF and DAC is a clock of a constant frequency outputted by the clock generating unit 6.

A microcomputer 10 transfers data indicating a reproduction state of the CD player to a display unit provided in a display and operation unit 9. Further, the microcomputer 10 identifies signals, such as designation of reproduction music pieces and start of reproduction, inputted through operation buttons of an operation unit provided in the display and operation unit 9, and controls the operation of the CD player.

The operation unit of the display and operation unit 9 is provided with a reproduction music piece specifying button for designating music pieces (tracks) to be reproduced, a reproduction start instruction button for instruction of starting reproduction, and the like. Further, after the optical pickup 2 searches a reproduction position, a display unit of the display and operation unit 9 displays that the CD player is in a reproduction standby state or reproducible state.

The storage unit 4 functions as a buffer that temporally stores audio data outputted from the data demodulating circuit 3C. Storing of the audio data into the storage unit 4 is controlled by a memory control unit 5.

The memory control unit 5 makes the storage unit 4 store the audio data outputted from the data demodulating circuit 3C, and reads the stored audio data to input it to the audio data conversion unit 8.

The clock used for making the storage unit 4 store the audio data and for reading the audio data from the storage unit 4 is outputted from the clock generating unit 6 and inputted to the memory control unit 5. Here, the clock frequency for making the storage unit 4 store the audio data is a clock frequency that is proportional to a linear velocity of the disk, and made to be higher than the read clock frequency.

Although not shown, the clock generating unit 6 comprises a reference clock generating circuit, a PLL circuit for generating a clock used for reading record data from the EFM signal, and a synchronous reference signal generating circuit for generating the synchronous reference signal.

In the clock generating unit 6, the signal outputted from the synchronous reference signal generating circuit is compared with the synchronizing signal detected from the EFM signal, with respect to their phases. A signal corresponding to the phase difference is inputted into the driving circuit 3A, and a voltage amplified by the driving circuit 3A is applied to the spindle motor 1.

By changing the frequency of the synchronous reference signal, it is possible to change the linear velocity of the spindle motor 1. Here, when the linear velocity of the spindle motor 1 is changed, the frequency of the EFM signal reproduced is changed. However, the PLL circuit similarly changes the clock frequency used for reading the data of EFM signal, and therefore, the data of the EFM signal is read correctly.

In the CD player of the present embodiment, the servo control and data demodulation unit 3 has a rotation control unit that controls the spindle motor 1 so that it rotates at about twice as large linear velocity as a predetermined linear velocity of 1.2–1.4 m/s.

A level detection unit 7 compares audio level of the audio data outputted from the data demodulating circuit 3C with a reference level, in order to detect audio data at a change point at which the audio level changes from the level lower than the reference level to the level higher than the reference level, and to detect the address of that audio data.

In the CD player of the present embodiment, the level detection unit 7 sets the soundless level or a level near to the soundless level as the reference audio level. Then, audio level of the audio data outputted from the data demodulating circuit 3C is compared with the reference level, to detect the address of the audio data that has the audio level higher than the reference level after the position of the soundless part existing in the front of a music piece.

Data showing the address detected by the level detection unit 7 is inputted into the microcomputer 10. On receiving this data, the microcomputer 10 controls operations of the servo control and data demodulation unit 3 and the memory control unit 5.

Next, operation of the CD player having the above-described structure will be described.

First, there will be described operation in the case that the CD player continuously reproduces music pieces in order of the music pieces in the audio data recorded on a CD 11.

Figure 2:
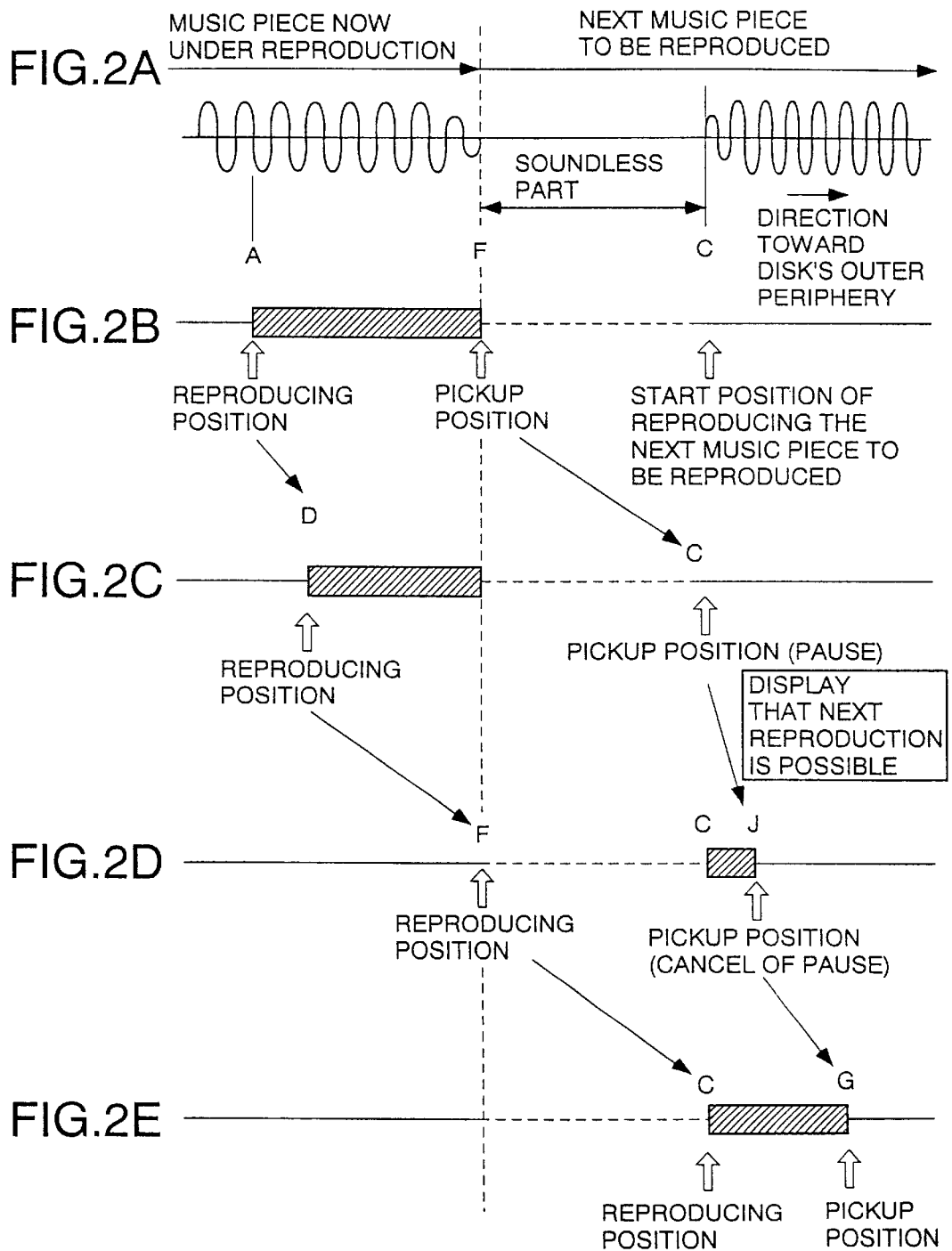
FIGS. 2A to 2E are a view schematically showing waveforms of audio signals demodulated from audio data recorded on a CD 11, and relations among audio data stored in a storage unit 4, reproducing positions and pickup positions, in the case that the CD player shown in FIG. 1 automatically and continuously reproduces music pieces in order of the music pieces in the audio data recorded on the CD 11.

FIG. 2 is a view schematically showing waveforms of audio signals demodulated from the audio data recorded on a CD 11, and relations among the audio data stored in the storage unit 4, reproducing positions and pickup positions, in the case that the CD player shown in FIG. 1 automatically and continuously reproduces music pieces in order of the music pieces in the audio data recorded on the CD 11.

In FIG. 2, "reproducing position" indicates a position on the CD 11 of audio data that the audio data conversion unit 8 is reading and reproducing from the storage unit 4. "Pickup position" indicates a position at which the optical pickup 2 is reproducing the record data from the CD 11. "Start position of reproducing the next music piece to be reproduced" indicates a position of the audio data on the CD11, at which the audio level becomes higher than the reference level following the soundless part (interval F–C)

in the front of the music piece. It is assumed that the front position (point F) of the soundless part is a front position of an interval in which audio level continues (about 0.2–1 second) to be less than the reference level in the range of 5–10 seconds away from the track end (this range can be recognized based on sub-code data). Intervals shown as the striped areas are ranges on the CD 11 of the audio data stored in the storage unit 4. Further, FIG. 2A shows reproduced waveforms of audio signals when the CD player reproduces music pieces from the inner periphery side toward the outer periphery side of the CD 11.

Now, as shown in FIG. 2B, when the "pickup position" arrives at the rear end (point F) of the "music piece now under reproduction", then, the microcomputer 10 controls the memory control unit 5 so that audio data outputted from the data demodulating circuit 3C is stopped from being stored into the storage unit 4. Here, the spindle motor 1 rotates at about twice as fast linear velocity as the predetermined linear velocity of 1.2–1.4 m/s of the CD 11. Further, the clock frequency for storing audio data into the storage unit 4 is a clock frequency proportional to the linear velocity of the disk, and higher than the clock frequency used for reading. Accordingly, at this time, the audio data conversion unit 8 reproduces the audio data at the "reproducing position" (point A) before the point F.

Next, as shown in FIG. 2C, when the "pickup position" arrives at the rear end (point C) of the soundless part of the "next music piece to be reproduced", namely arrives at the "start position of reproducing the next music piece to be reproduced", then, the microcomputer 10 receives data indicating the address, from the level detection unit 7. Then, according to that address, the microcomputer 10 makes the optical pickup 2 wait (pause) at the point C specified by that address. Further, the microcomputer 10 makes the display part of the display and operation unit 9 display that the "next music piece to be reproduced" can be immediately reproduced. Or, the microcomputer 10 may make the storage unit 4 store record data corresponding to one or more rotation of the disk from the point C and make the optical pickup 2 wait at that position (point C+α).

Next, as shown in FIG. 2D, when the "reproducing position" arrives at the rear end (point F) of the "music piece now under reproduction", then, the microcomputer 10 cancels the waiting of the optical pickup 2 at the point C (C+α), and makes it reproduce the record data. Further, the microcomputer 10 controls the memory control unit 5 to start storing of audio data outputted from the data demodulating circuit 3C into the storage unit 4. Further, the microcomputer 10 stops the display that the "next music piece to be reproduced" can be immediately reproduced, displayed on the display part of the display and operation unit 9.

Here, the capacity of the audio data that can be stored in the storage unit 4 depends on the storage capacity of the memory that can be mounted, and, in the present embodiment, it is about 2–10 seconds in terms of reproduction time.

By thus-described operation, the storage unit 4 stores the audio data of the "next music piece to be reproduced" removed of the data of the soundless part (interval F–C), next to the audio data of the "music piece now under reproduction".

Accordingly, when the "reproducing position" arrives at the rear end (point F) of the "music piece now under reproduction", then, the audio data conversion unit 8 immediately starts reproducing the audio data of the "next music piece to be reproduced", skipping the soundless part, as shown in FIG. 2E.

Next, there will be described operation in the case that the CD player stops reproducing a music piece in the course of reproduction, by an operator's instruction, and starts reproducing the next music piece, thus reproducing the music pieces continuously.

Figure 3:
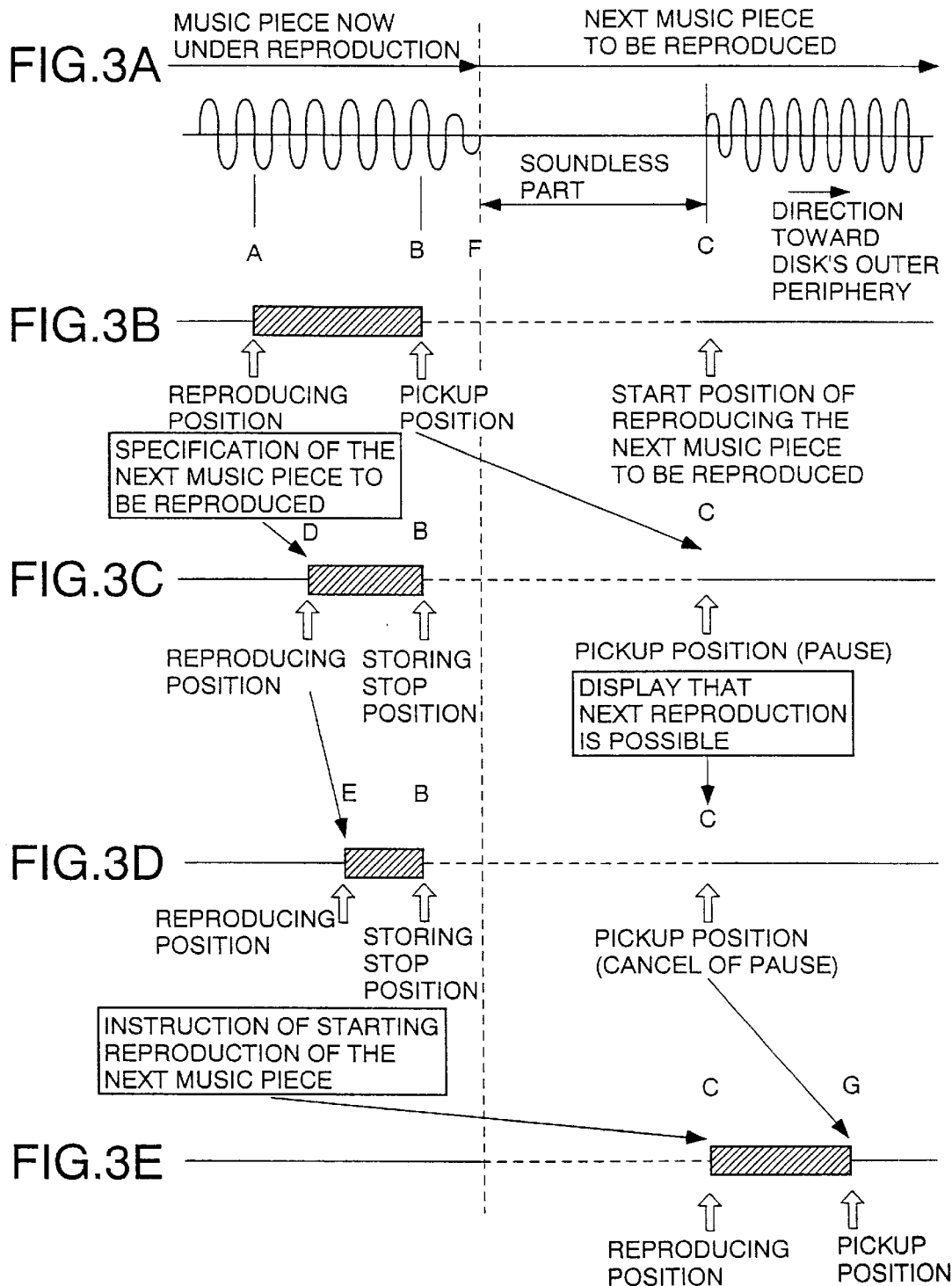
FIGS. 3A to 3E are a view schematically showing waveforms of audio signals demodulated from audio data recorded on the CD 11, and relations among the audio data stored in the storage unit 4, reproducing positions and pickup positions, in the case that the CD player shown in FIG. 1 stops reproducing a music piece in the course of reproduction, by an operator's instruction, and starts reproducing the next music piece, thus reproducing the music pieces continuously.

FIG. 3 is a view schematically showing waveforms of audio signals demodulated from audio data recorded on the CD 11, and relations among the audio data stored in the storage unit 4, reproducing positions and pickup positions, in the case that the CD player shown in FIG. 1 stops reproducing a music piece in the course of reproduction, by an operator's instruction, and starts reproducing the next music piece, thus reproducing the music pieces continuously.

In FIG. 3, "reproducing position", "pickup position", "start position of reproducing the next music piece to be reproduced", front position of the soundless part, and the striped areas are used in the same meanings as in FIG. 2. Further, similarly to FIG. 2A, FIG. 3A also shows reproduced waveforms of audio signals when the CD player reproduces music pieces from the inner periphery side toward the outer periphery side of the CD 11.

Now, as shown in FIG. 3B, when the microcomputer 10 detects that the reproduction music piece specifying button provided in the operation part of the display and operation unit 9 has been pushed to specify the "next music piece to be reproduced", then, the microcomputer 10 controls the memory control unit 5 to stop storing of the audio data outputted from the data demodulating circuit 3C into the storage unit 4. Then, the microcomputer 10 makes the optical pickup 2 move to the front position (point F) of the "next music piece to be reproduced".

Next, as shown in FIG. 3C, when the "pickup position" arrives at the rear end (point C) of the soundless part of the "next music piece to be reproduced", namely arrives at the "start position of reproducing the next music piece", the microcomputer 10 receives data indicating the address, from the level detection unit 7. According to that address, the microcomputer 10 makes the optical pickup 2 wait (pause) at the point C specified by that address. Further, the microcomputer 10 makes the display unit of the display and operation unit 9 display that the "next music piece to be reproduced" can be immediately reproduced. Or, the microcomputer 10 may make the storage unit 4 store record data corresponding to one or more rotation of the disc from the point C and make the optical pickup 2 wait at that position (point C+α).

Next, as shown in FIG. 3D, when it is detected that the reproduction start instruction button provided in the operation unit of the display and operation unit 9 has been pushed, then, the microcomputer 10 controls the memory control unit 5 to erase audio data (data of the "music piece now under reproduction") stored in the storage unit 4. Then, the microcomputer 10 cancels the waiting of the optical pickup 2 at the point C (C+α), and makes it reproduce the record data. The microcomputer 10 starts storing the audio data outputted from the data demodulating circuit 3C into the storage unit 4. Further, the microcomputer 10 stop displaying that the "next music piece to be reproduced" can be immediately reproduced, displayed on the display unit of the display and operation unit 9.

By thus-described operation, the storage unit 4 stores the audio data of the "next music piece to be reproduced" removed of the data of the soundless unit (interval F–C).

Accordingly, as shown in FIG. 3E, when the reproduction instruction button is pushed, the audio data conversion unit 8 stops reproducing the "music piece now under reproduction", and immediately starts reproducing the audio data of the "next music piece to be reproduced", skipping the soundless part.

Here, in the case that the reproduction start button of the display and operation unit 9 has not been pushed in the state that the optical pickup 2 waits (pauses) at the point C (C+α), and the display unit of the display and operation unit 9 displays that the "next music piece to be reproduced" can be immediately reproduced, then, when the "reproducing position" arrives at the pickup position (point B) at the time of pushing the reproduction music piece specifying button, the microcomputer 10 cancels the waiting of the optical pickup 2 at the point C and makes it reproduce the record data. Further, the microcomputer 10 controls the memory control unit 5 to start storing the audio data outputted from the data demodulating circuit 3C into the storage unit 4. By thus-described operation, music pieces can be continuously reproduced without producing a soundless state.

Hereinabove, the first embodiment of the present invention has been described.

As described above, the present embodiment can continuously reproduce music pieces without producing a soundless state. While the optical pickup 2 is in operation of searching the "next music piece to be reproduced", the audio data stored in the storage unit 4 is read and reproduced. Accordingly, a soundless state is not produced in switching music pieces reproduced.

Further, when the optical pickup 2 is at the "start position of reproducing the next music piece to be reproduced", it is informed that the music in question can be immediately reproduced. Thus, an operator can easily recognize an appropriate time to push the reproduction start button.

Thus, according to the present embodiment, in the case that various music pieces recorded on a same disk are continuously reproduced by one disk player, reproduction of the music pieces can be continued even in the course of searching the next music piece. Further, it is displayed that the search operation of the next music piece has been finished and the music piece in question can be immediately reproduced, and accordingly, continuous reproduction can be realized without producing a soundless state between music pieces.

Next, a second embodiment of the present invention will be described.

Figure 4:
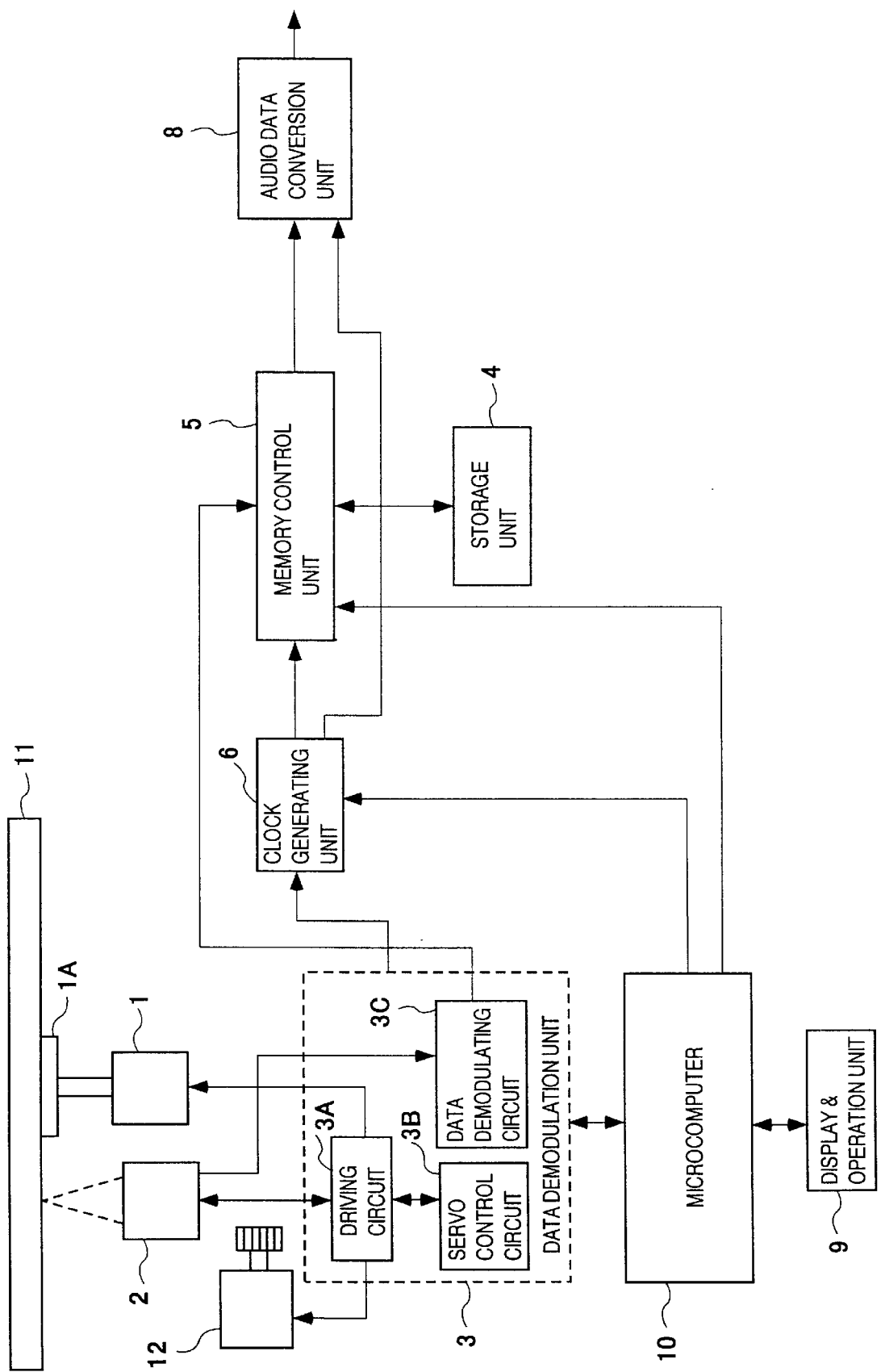
FIG. 4 is a schematic block diagram of a CD player to which a second embodiment of the present invention is applied.

FIG. 4 is a schematic block diagram of a CD player to which the second embodiment of the present invention is applied.

The CD player shown in FIG. 4 of the present embodiment differs from the CD player shown in FIG. 1 of the first embodiment in that the level detection unit 7 is not provided and that an addressing receiving button for receiving an audio data reproduction stop address and a reproduction start address is provided in the operation unit of the display and operation unit 9. The other components are fundamentally similar to the ones of the first embodiment shown in FIG. 1.

The addressing receiving button provided in the operation unit of the display and operation unit 9 receives designation of an reproduction stop address and reproduction start address, using time information of the sub-code data. The microcomputer 10 stores the reproduction stop address and the reproduction start address received through the addressing receiving button into, for example, a self-contained memory (not shown).

Next, operations of the CD player of thus-described structure will be described.

First, there will be described an operation in the case that, in the course of reproducing audio data, designation of a reproduction stop address of the audio data under reproduction and a reproduction start address of the next audio data to be reproduced is received through the addressing receiving button provided in the operation unit of the display and operation unit 9.

FIG. 5 is a view schematically showing waveforms of audio signals demodulated from audio data recorded on the CD 11 and relations among the audio data stored in the storage unit 4, reproducing positions and pickup positions, in the case that, in the course of reproducing audio data, designation of a reproduction stop address of the audio data under reproduction and a reproduction start address of the next audio data to be reproduced is received through the addressing receiving button provided in the operation unit of the display and operation unit 9.

In FIG. 5, "reproduction stop position" and "next reproduction start position" respectively indicate the positions on the CD 11 of the reproduction stop address of the audio data under reproduction and the reproduction start address of the next audio data to be reproduced, designated through the addressing receiving button provided in the operation unit of the display and operation unit 9. The "reproducing position", "pickup position", and the striped areas are used in the same meanings as in FIGS. 2 and 3. Further, similarly to FIGS. 2A and 3A, FIG. 5A also shows reproduced waveforms of audio signals when the CD player reproduces music pieces from the inner periphery side toward the outer periphery side of the CD 11.

Now, as shown in FIG. 5B, when the "pickup position" arrives at the "reproduction stop position" (point B), the microcomputer 10 controls the memory control unit 5 to stop storage of the audio data outputted from the data demodulating circuit 3C into the storage unit 4. Further, the microcomputer 10 makes the optical pickup 2 move to the "next reproduction start position" (point C).

Here, the spindle motor 1 rotates at about twice as large linear velocity as the predetermined linear velocity of 1.2–1.4 m/s of the CD 11. Further, the clock frequency for storing audio data into the storage unit 4 is a clock frequency proportional to the linear velocity of the disk, and higher than the clock frequency used for reading. Accordingly, at this time, the audio data conversion unit 8 reproduces the audio data at the "reproducing position" (point A) before the point B.

Next, as shown in FIG. 5C, when the "pickup position" arrives at the "next reproduction start position" (point C), then, the microcomputer 10 makes the optical pickup 2 wait (pause) at this point C. Further, the microcomputer 10 makes the display unit of the display and operation unit 9 display that the "next music piece to be reproduced" can be immediately reproduced. Or, the microcomputer 10 may make the storage unit 4 store data corresponding to one or more rotation of the disk from the point C and make the optical pickup 2 wait at that position (point C+α).

Next, as shown in FIG. 5D, when the "reproducing position" arrives at the "reproduction stop position" (point B), then, the microcomputer 10 cancels the waiting of the optical pickup 2 at this point C (C+α), and makes it reproduce the record data. Further, the microcomputer 10 controls the memory control unit 5 to start storing of audio data outputted from the data demodulating circuit 3C into the storage unit 4. Further, the microcomputer 10 stops the display that the "next music piece to be reproduced" can be immediately reproduced, displayed on the display unit of the display and operation unit 9.

By thus-described operation, the storage unit 4 stores the audio data of the "next music piece to be reproduced" on and after the reproduction start address (point C) designated by the addressing receiving button, next to the audio data of the "music piece now under reproduction" at the reproduction stop address (point B) designated by the addressing receiving button.

Accordingly, as shown in FIG. 5E, when the "music piece now under reproduction" arrives at the reproduction stop address (point B), the audio data conversion unit 8 immediately starts reproducing the "next music piece to be reproduced" from the reproduction start address (point C).

Next, there will be described operation in the case that the reproduction start button provided in the operation unit of the display and operation unit 9 is pushed in the state that, in the course of reproduction of audio data, designation of the reproduction stop address of the audio data under reproduction and the reproduction start address of the next audio data to be reproduced has been received through the addressing receiving button provided in the operation unit of the display and operation unit 9.

FIG. 6 is a view schematically showing waveforms of audio signals demodulated from the audio data recorded on a CD 11, and relations among the audio data stored in the storage unit 4, reproducing positions and pickup positions, in the case that the reproduction start button provided in the operation unit of the display and operation unit 9 is pushed in the state that, in the course of reproduction of audio data, designation of the reproduction stop address of the audio data under reproduction and the reproduction start address of the next audio data to be reproduced has been received through the addressing receiving button provided in the operation unit of the display and operation unit 9.

Here, in FIG. 6, "reproducing position", "pickup position", "reproduction stop position", "next reproduction start position" and the striped areas are used in the same meaning as in FIG. 5. Further, similarly to FIG. 5A, FIG. 6A also shows reproduced waveforms of audio signals when the CD player reproduces music pieces from the inner periphery side toward the outer periphery side of the CD 11.

Now, as shown in FIG. 6B, when the "pickup position" arrives at "reproduction stop position" (point B), then, the microcomputer 10 controls the memory control unit 5 to stop storing of the audio data outputted from the data demodulating circuit 3C into the storage unit 4. Further, the microcomputer 10 makes the optical pickup 2 move to the "next reproduction start position" (point C).

Next, as shown in FIG. 6C, when the "pickup position" arrives at the "next reproduction start position" (point C), the microcomputer 10 makes the optical pickup 2 wait (pause) at this point C. Further, the microcomputer 10 makes the display unit of the display and operation unit 9 display that the "next music piece to be reproduced" can be immediately reproduced. Or, the microcomputer 10 may make the storage unit 4 store record data corresponding to one or more rotation of the disk from the point C and make the optical pickup 2 wait at that position (point C+α).

Next, as shown in FIG. 6D, when the reproduction start button provided in the operation unit of the display and operation unit 9 is pushed by an operator in the course of reproduction of the "music piece now under reproduction", then, the microcomputer 10 controls the memory control unit 5 to erase the audio data (data of the "music piece now under reproduction") stored in the storage unit 4. Then, the microcomputer 10 cancels the waiting of the optical pickup 2 at the point C (C+α), and makes it reproduce the record data. Then, the microcomputer 10 starts storing the audio data outputted from the data demodulating circuit 3C into the storage unit 4. Further, the microcomputer 10 stops the display that the "next music piece to be reproduced" can be immediately reproduced, displayed on the display unit of the display and operation unit 9.

Accordingly, as shown in FIG. 6E, the audio data conversion unit 8 immediately starts reproducing the "next music piece to be reproduced" when the reproduction start button is pushed.

Next, a variation of the present second embodiment will be described.

This variation is different from the above-described second embodiment in operation in the case that the reproduction start button provided in the operation unit of the display and operation unit 9 is pushed in the state that, in the course of reproduction of audio data, designation of the reproduction stop address of the audio data under reproduction and the reproduction start address of the next audio data to be reproduced has been received through the addressing receiving button provided in the operation unit of the display and operation unit 9.

FIG. 7 is a view schematically showing waveforms of audio signals demodulated from the audio data recorded on a CD 11, and relations among the audio data stored in the storage unit 4, reproducing positions and pickup positions, in the case that the reproduction start button provided in the operation unit of the display and operation unit 9 is pushed in the state that, in the course of reproduction of audio data, designation of the reproduction stop address of the audio data under reproduction and the reproduction start address of the next audio data to be reproduced has been received through the addressing receiving button provided in the operation unit of the display and operation unit 9.

Here, in FIG. 7, "reproducing position", "pickup position", "reproduction stop position", "next reproduction start position" and the striped areas are used in the same meaning as in FIGS. 5 and 6. Further, similarly to FIGS. 5A and 6A, FIG. 7A also shows reproduced waveforms of audio signals when the CD player reproduces music pieces from the inner periphery side toward the outer periphery side of the CD 11.

Now, as shown in FIG. 7B, when the reproduction start button provided in the operation unit of the display and operation unit 9 is pushed by an operator (the first time) in the course of reproducing the "music piece now under reproduction", then, the microcomputer 10 controls the memory control unit 5 to stop storing of the audio data outputted from the data demodulating circuit 3C into the storage unit 4. Further, the microcomputer 10 makes the optical pickup 2 move to the "next reproduction start position" (point C).

Next, as shown in FIG. 7C, when the "pickup position" arrives at the "next reproduction start position" (point C), the microcomputer 10 makes the optical pickup 2 wait (pause) at this point C. Further, the microcomputer 10 makes the display unit of the display and operation unit 9 display that the "next music piece to be reproduced" can be immediately reproduced. Or, the microcomputer 10 may make the storage unit 4 store record data corresponding to one or more rotation of the disk from the point C and make the optical pickup 2 wait at this position (point C+α).

Next, as shown in FIG. 7D, when the reproduction start button provided in the operation unit of the display and operation unit 9 is pushed by the operator (the second time) in the course of reproducing the "music piece now under reproduction", then, the microcomputer 10 controls the memory control unit 5 to erase the audio data (data of the "music piece now under reproduction") stored in the storage unit 4. Then, the microcomputer 10 cancels the waiting of the optical pickup 2 at the point C (C+α), and makes it reproduce the record data. Further, the microcomputer 10 starts storing the audio data outputted from the data demodulating circuit 3C into the storage unit 4. Further, the microcomputer 10 stops the display that the "next music piece to be reproduced" can be immediately reproduced, displayed on the display unit of the display and operation unit 9.

Accordingly, as shown in FIG. 7E, when the reproduction start button is pushed, the audio data conversion unit 8 immediately starts reproducing the "next music piece to be reproduced" from the reproduction start address.

Hereinabove, the second embodiment of the present invention has been described.

According to the present embodiment, by operating the reproduction start button while confirming the display that the "next music piece to be reproduced" can be reproduced, it is possible to perform button operation of switching music pieces under reproduction after confirming that the optical pickup 2 has arrived at the next reproducing position. Accordingly, the button operation becomes easy and an operational error can be prevented.

Further, by selecting a plurality of music pieces to be reproduced and storing the numbers of those music pieces by turns into a memory, it is possible to continuously reproduce the music pieces in the programmed order. Here, the selection of the music pieces is carried out using buttons such as ten keys provided in the display and operation unit 9. When the reproduction start instruction button is pushed while a music piece is under reproduction, then, the microcomputer 10 stops storing of audio data outputted from the servo control and data demodulation unit 3 into the storage unit 4. Further, the optical pickup 2 searches the front position of the next music piece in the programmed order in the memory, and gets into a pause state at the position of finishing the search. As the front position of the next music piece, the position at which index data of the sub-code data becomes "01" from "00" may be used, in order not to reproduce soundless audio data in the pause area.

When the optical pickup 2 gets into a pause state, the servo control and data demodulation unit 3 sends the microcomputer 10 a signal indicating that the optical pickup 2 can detect record data. Receiving this signal, the microcomputer 10 controls the memory control unit 5 to start storing of audio data outputted from the servo control and data demodulation unit 3 into the storage unit 4. After the storing of the audio data into the storage unit 4 is started, the memory control unit 5 reads the audio data whose storing into the storage unit 4 is started, and inputs it into the audio data conversion unit 8.

As described above, when music pieces, whose numbers have been programmed in advance, are reproduced in the programmed order in the conventional CD player that rotates a CD at a predetermined linear velocity, in order to avoid a soundless time in a reproduced music piece, there has been proposed the apparatus that stores audio data of the starting parts of all the music pieces programmed.

When, for example, starting parts of 10 pieces of audio data corresponding to 10 pieces of music are to be stored, such a kind of apparatus requires a memory corresponding to 100 seconds assuming that one piece is 10 seconds. In the case that stereophonic reproduction is carried out with the quantitization bit number of 16 bits and at a predetermined sampling frequency of 44.1 KHz, storing capacity of about 141 megabits is required.

In contrast, in the present embodiment, the capacity of the storage unit 4 requires about 14.1 megabits only, which corresponds to a piece of music.

Thus, even when music pieces are reproduced in programmed order and the optical pickup 2 is in searching operation to start reproducing the next music piece, memory capacity for one piece of music is sufficient for continuously reproducing any number of music pieces without interruption, since audio data is detected from a CD 11 rotating faster than the predetermined linear velocity and stored into the storage unit 4 so as to be read and reproduced from the storage unit 4.

Further, since it is sufficient to provide only memory capacity corresponding to a piece of music, a low-cost disk reproducing apparatus can be obtained.

In the above-described embodiments, the description has been given with respect to the case in which a CD is used as the storage medium and CD-DA format audio data is used as the contents data. However, the present invention is not limited to this. For example, another storage medium such as a DVD (Digital Versatile DisK) or MD (Mini Disk) may be used. Further, the present invention can be widely applied to another contents data such as video data.

When video data is used as the contents data, it is sufficient, in the first embodiment of the present invention, that the level detection unit 7 compares a brightness level of the video data with the black level in order to detect existence or non-existence of the video data.

What is claimed is:

1. A contents data reproducing apparatus for reproducing plural pieces of contents data stored in a storage medium, comprising:
a pickup for reading the contents data from the storage medium;
a level comparison means for comparing between a level of the contents data read by said pickup and a predetermined reference level;
a buffer for storing the contents data read by said pickup;
a reproducing means for reproducing the contents data stored in said buffer; and
a control means for writing the contents data read by said pickup into said buffer and for reading the contents data stored in said buffer to send said contents data to said reproducing means;
wherein:
when said pickup finishes reading of a reproducing object piece of contents data, said control means stops writing of the contents data into said buffer and makes said pickup move to a front of a next reproducing object piece of contents data to start reading of said next reproducing object piece of contents data; and
when, a result of comparison by said level comparison means shows that a level of said next reproducing object piece of contents data becomes higher than said predetermined reference level, then, said control means stars writing of the next reproducing object piece of contents data, which is read by said pickup, into said buffer means.

2. A contents data reproducing apparatus for reproducing plural pieces of contents data stored in a storage medium, comprising:
a pickup for reading the contents data from the storage medium;

a level comparison means for comparing between a level of the contents data read by said pickup and a predetermined reference level;

a buffer for storing the contents data read by said pickup;

a reproducing means for reproducing the contents data stored in said buffer;

a reproducing object designation receiving means for receiving designation of a next piece of contents data to be reproduced out of the plural pieces of contents data stored in said storage medium;

a display means for displaying that a piece of contents data whose designation is received by said reproducing object designation receiving means can be immediately reproduced;

a reproduction start instruction receiving means for receiving an instruction of starting reproduction of the piece of contents data whose designation is received by said reproducing object designation receiving means; and a control means for wiring the contents data read by said pickup into said buffer and for reading the contents data stored in said buffer to send said contents data to said reproducing means;

wherein:

when, in the course of reading a reproducing object piece of contents data by said pickup, said reproducing object designation receiving means receives designation, said control means stops writing of contents data into said buffer, and makes said pickup move to a front of the designated piece of contents data to start reading of said designated piece of contents data;

when the pickup that has started reading said designated piece of contents data moves to a position at which a result of comparison by said level comparison means shows that a level of said designated contents data becomes higher than the predetermined reference level, then, said control means makes said pickup wait at said position and makes display means display that said designated piece of contents data can be immediately reproduced; and when said reproduction start instruction receiving means receives an instruction of starting reproduction in a state that said display means displays that immediate reproduction is possible, then, said control means cancels waiting of said pickup to make the pickup start reading said designated piece of contents data, and starts writing of said designated piece of contents data, which is read by said pickup, into said buffer.

3. A contents data reproducing apparatus for reproducing plural pieces of contents data stored in a storage medium, comprising:

a pickup for reading the contents data from the storage medium;

a buffer for storing the contents data read by said pickup;

a reproducing means for reproducing the contents data stored in said buffer;

an addressing receiving means for receiving designation of a reproduction stop address at which reproduction of a piece of contents data under reproduction out of said plural pieces of contents data stored in said storage medium is stopped, and designation of a reproduction start address at which reproduction of a next piece of contents data to be reproduced is started; and a control means for writing the contents data read by said pickup into said buffer and for reading the contents data stored in said buffer to send said contents data to said reproducing means;

wherein:

when a position at which said pickup reads said piece of contents data under reproduction arrives at a position corresponding to the reproduction stop address received by said addressing receiving means, then, said control means stops writing of the contents data into said buffer and makes said pickup move to a position corresponding to the reproduction start address received by said addressing receiving means; and when said pickup arrives at the position corresponding to said reproduction start address, said control means makes said pickup wait at said position corresponding to said reproduction start address;

when data corresponding to said reproduction stop address is read from said buffer to said reproducing means in a state that said pickup waits, then said control means cancels waiting of said pickup to make the pickup start reading of said next piece of contents data to be reproduced, and starts writing of said next piece of contents data to be reproduced, which is read by said pickup, into said buffer.

4. A contents data reproducing apparatus for reproducing plural pieces of contents data stored in a storage medium, comprising:

a pickup for reading the contents data from the storage medium;

a buffer for storing the contents data read by said pickup;

a reproducing means for reproducing the contents data stored in said buffer;

an addressing receiving means for receiving designation of a reproduction stop address at which reproduction of a piece of contents data under reproduction out of said plural pieces of contents data stored in said storage medium is stopped, and designation of a reproduction start address at which reproduction of a next piece of contents data to be reproduced is started;

a reproduction start instruction receiving means for receiving an instruction of starting reproduction of said next piece of contents data to be reproduced whose reproduction start address is received by said addressing receiving means;

a display means for displaying that said next piece of contents data to be reproduced for which the instruction of starting reproduction is received by said reproduction start instruction receiving means can be immediately reproduced; and a control means for writing the contents data read by said pickup into said buffer and for reading the contents data stored in said buffer to send said contents data to said reproducing means;

wherein:

when a position at which said pickup reads said piece of contents data under reproduction arrives at a position corresponding to the reproduction stop address received by said addressing receiving means, then, said control means stops writing of the contents data into said buffer and makes said pickup move to a position corresponding to the reproduction start address received by said addressing receiving means;

when said pickup arrives at the position corresponding to said reproduction start address, said control means makes said pickup wait at said position corresponding to said reproduction start address and makes said display means display that the next piece of contents data to be reproduced can be immediately reproduced; and when said reproduction start instruction receiving means receives an instruction of starting reproduction in a state that said display means displays that immediate reproduction is possible, then said control means cancels waiting of said pickup to make the pickup start reading of said next piece of contents data to be reproduced, and, after clearing said buffer, starts writing of said next piece of contents data to be reproduced, which is read by said pickup, into said buffer.

5. A contents data reproducing apparatus for reproducing plural pieces of contents data stored in a storage medium, comprising:

a pickup for reading the contents data from the storage medium;

a buffer for storing the contents data read by said pickup;

a reproducing means for reproducing the contents data stored in said buffer;

an addressing receiving means for receiving designation of a reproduction stop address at which reproduction of a piece of contents data under reproduction out of said plural pieces of contents data stored in said storage medium is stopped, and designation of a reproduction start address at which reproduction of a next piece of contents data to be reproduced is started;

a reproduction start instruction receiving means for receiving an instruction of starting reproduction of said next piece of contents data to be reproduced whose reproduction start address is received by said addressing receiving means;

a display means for displaying that said next piece of contents data to be reproduced for which the instruction of starting reproduction is received by said reproduction start instruction receiving means can be immediately reproduced; and a control means for writing the contents data read by said pickup into said buffer and for reading the contents data stored in said buffer to send said contents data to said reproducing means;

wherein:

when said reproduction start instruction receiving means receives an instruction of starting reproduction, then, said control means stops writing of the contents data into said buffer and makes said pickup move to a position corresponding to the reproduction start address received by said addressing receiving means;

when said pickup arrives at the position corresponding to said reproduction start address, said control means makes said pickup wait at said position corresponding to said reproduction start address and makes said display means display that the next piece of contents data to be reproduced can be immediately reproduced; and when said reproduction start instruction receiving means receives an instruction of starting reproduction in a state that said display means displays that immediate reproduction is possible, then said control means cancels waiting of said pickup to make the pickup start reading of said next piece of contents data to be reproduced, and, after clearing said buffer, starts writing of said next piece of contents data to be reproduced, which is read by said pickup, into said buffer.

* * * * *